United States Patent [19]

Friauf

[11] 4,398,101
[45] Aug. 9, 1983

[54] FOUR INPUT COINCIDENCE DETECTOR

[75] Inventor: Walter S. Friauf, Bethesda, Md.

[73] Assignee: The United States of America as represented by the Department of Health and Human Services, Washington, D.C.

[21] Appl. No.: 222,936

[22] Filed: Jan. 6, 1981

[51] Int. Cl.³ .................. G01T 1/172; H03K 5/06; H03K 19/21

[52] U.S. Cl. .................. 307/445; 250/369; 307/465; 307/470; 307/603; 328/110

[58] Field of Search .............. 307/445, 465, 470, 518, 307/528, 600–603; 328/109–110; 250/369

[56] References Cited

U.S. PATENT DOCUMENTS 2,999,157  9/1961  Rosenstock ............... 250/336.1 X
3,291,973  9/1964  Rasche ..................... 307/445 X
3,721,833  3/1973  Kramer .................... 307/602 X
3,955,088  5/1976  Muehllehner et al. ...... 250/369 X
4,044,258  8/1977  Frungel .................... 250/336.1

Primary Examiner—Stanley D. Miller
Assistant Examiner—David R. Hudspeth
Attorney, Agent, or Firm—Browdy and Neimark

[57] ABSTRACT

A gamma ray scintillation coincidence detection circuit having four inputs connected to two gating configurations, fed by gamma ray detector units. Detection in any one of the four inputs develops a disabling signal in one signal path leading to an AND gate. Detection in any two of the four inputs results in a system output in another signal path. When any input goes high, the AND gate is disabled after a predetermined settable time delay T. If a second input goes high before the expiration of the delay time T, then the signal in the other path can pass through the AND gate and sets a latch, signifying that detector coincidence has occurred.

14 Claims, 4 Drawing Figures

FOUR-INPUT COINCIDENCE DETECTOR

Two-Input Coincidence Detector

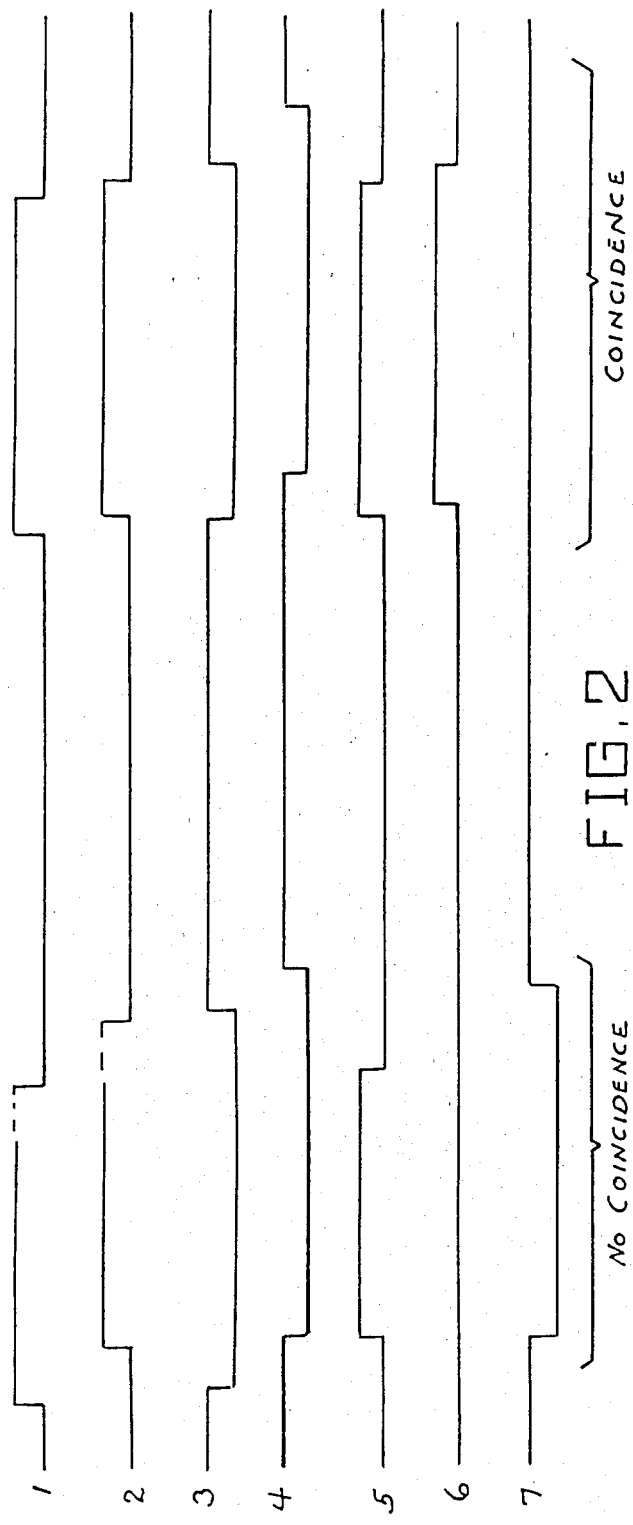
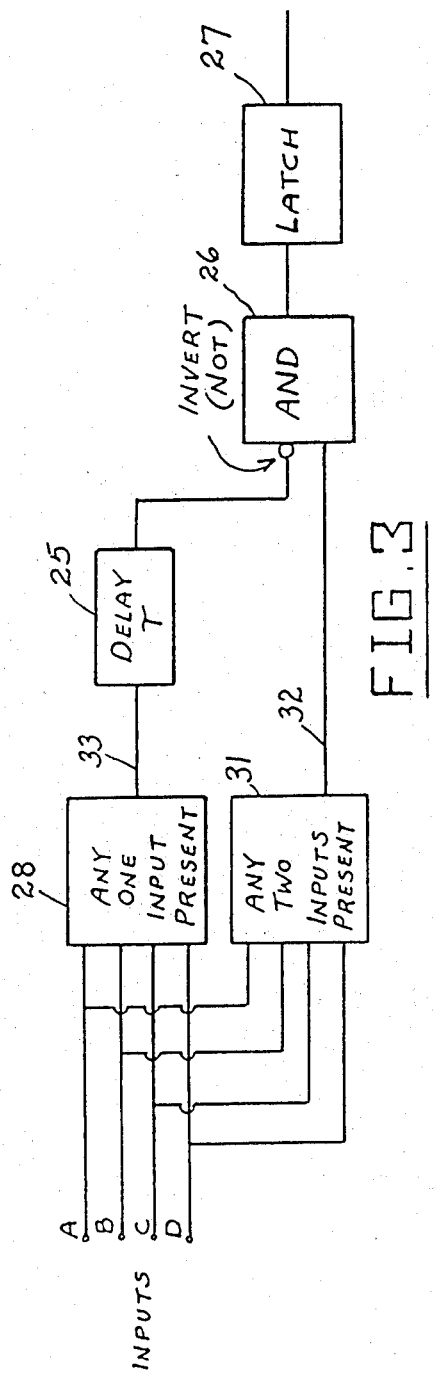

FOUR-INPUT COINCIDENCE DETECTOR

FOUR INPUT COINCIDENCE DETECTOR

FIELD OF THE INVENTION

This invention relates generally to the measurement of nuclear radiation using scintillation counters, and more particularly to positron imaging systems in which two gamma rays resulting from the annihilation of a positron can be identified by the fact that they are detected almost simultaneously.

BACKGROUND OF THE INVENTION

In the measurement of radioactivity it is now common to employ the "coincidence counting" technique, wherein events relating to radioactive decay are detected in two or more detectors within a given time interval in order to eliminate various sources of error which would be introduced if only one detector were used. One of the most widely used devices for the measurement of radiation from radioactive substances is the scintillation counter. The basic element of a scintillation counter is a scintillation medium which absorbs incident radiation and emits photons as a result. Many of the emitted photons are incident upon a photo-cathode in a nearby photomultiplier tube, and the output of the photomultiplier tube is a measurable electrical pulse having a magnitude which is approximately proportional to the energy of the incident radiation.

A significant problem encountered in such use of scintillation counters is that there are a number of extraneous phenomena unrelated to the radioactivity of the sample, which produce output pulses from the photomultiplier tube of a scintillation counter. Such phenomena have been characterized as "singles" events, derived from extraneous factors, such as background or tube noise, or the like, independent of any detected radiation. By using the well known "coincidence" technique, the detection of "singles" events is substantially eliminated. This involves the use of two photomultiplier tubes respectively disposed on different sides of the sample. The effect of true radioactivity in the sample can typically produce emission of many photons simultaneously, or nearly simultaneously. Thus, there is a high probability that such an event will be detected by both photomultiplier tubes at nearly the same time. A "singles" event, however, would generate an output pulse from only one of the phototubes. Coincidence detectors distinguish legitimate pulses produced by a sample or source being measured from those produced by background or noise factors, on the basis of the degree of coincidence of the outputs from the two photomultiplier tubes.

In the case of positron imaging systems, two-input coincidence detectors have been commercially available for many years, but so far as is known, no four-input coincidence detectors exist in the prior art. The functional requirements of a system with four groups of detectors could be met by using six conventional 2-input detectors, but only at considerably greater cost than when using a single 4-input detector as will be presently described herein. Use of a single 4-input detector has the further advantage that the effective coincidence interval is the same for all combinations of detectors.

A preliminary search of the prior art yielded the following prior U.S. patents of interest;

Somerville, U.S. Pat. No. 2,939,013, Rosenstock, U.S. Pat. No. 2,999,157, Jordan, U.S. Pat. No. 3,560,744, Paine et al, U.S. Pat. No. 3,609,353, White, U.S. Pat. No. 3,792,255, Frungel, U.S. Pat. No. 4,044,258, and Luitwieler, U.S. Pat. No. 4,049,966.

SUMMARY OF THE INVENTION

The apparatus of the present invention was developed for use in positron imaging systems, in which the two gamma rays resulting from the annihilation of a positron can be identified by the fact that they are detected almost simultaneously. When large numbers of detectors are employed, it is necessary for economic reasons to divide the detectors into several groups and to detect coincidences between groups rather than between individual detectors. The apparatus of the present invention was designed specifically for a system in which the detectors are divided into four groups, and wherein the detection of gamma rays in any two of the four groups within a prescribed time interval results in an output from the coincidence detector.

In a typical embodiment, 128 evenly spaced detectors, for example, of the bismuth germanate (BGO) type are used in a circular array surrounding a patient, with a group of 32 detectors in each of the four quadrants of the array. The detectors are connected to respective OR gates, one for each group, providing an output signal A, B, C or D whenever a detector in the group responds to a scintillation.

The signals A, B, C and D are positive-going pulses, and the coincidence detector provides an output pulse if, and only if, the leading edges of the two pulses occur within a specified maximum time of each other. In the typical embodiment above mentioned, the pulses are derived from gamma ray detectors consisting of BGO crystals and associated photomultiplier tubes. The purpose is to detect the two gamma rays resulting from the annihilation of a positron; these two gamma rays will be detected at almost the same time by two detectors.

Accordingly, a main object of the invention is to provide a novel and improved coincidence detector which avoids the disadvantages and overcomes the deficiencies of the coincidence detectors previously employed in positron imaging systems.

A further object of the invention is to provide a novel and improved four-input coincidence detector which meets the functional requirements which previously could only be met by employing six conventional 2-input coincidence detectors, and which therefore provides a considerably reduced cost.

A still further object of the invention is to provide a four-input coincidence detector for use in a system with four groups of scintillation detectors and which comprises a single coincidence detector unit wherein the effective coincidence interval is the same for all combinations of scintillation detectors.

A still further object of the invention is to provide an improved coincidence detector for use in positron imaging systems wherein a relatively large number of scintillation detectors is employed, divided into several groups, and wherein coincidences between groups are detected rather than between individual scintillation detectors.

A still further object of the invention is to provide an improved four-input coincidence detector for use in a positron imaging system, wherein the scintillation detectors are divided into four groups and wherein the detection of gamma rays in any two of the four groups within a prescribed time interval results in an output from the coincidence detector, the circuitry of the coincidence detector operating to derive said output in a very simple, fast, and precise fashion.

BRIEF DESCRIPTION OF THE DRAWINGS

Further objects and advantages of the invention will become apparent from the following description and claims, and from the accompanying drawings, wherein:

FIG. 2 are pulse timing diagrams associated with the coincidence detector of FIG. 1.

FIG. 3 is a block diagram showing the general arrangement of the main components of a four-input coincidence detector constructed in accordance with the present invention.

DETAILED DESCRIPTION OF A PREFERRED EMBODIMENT

Figure 1:
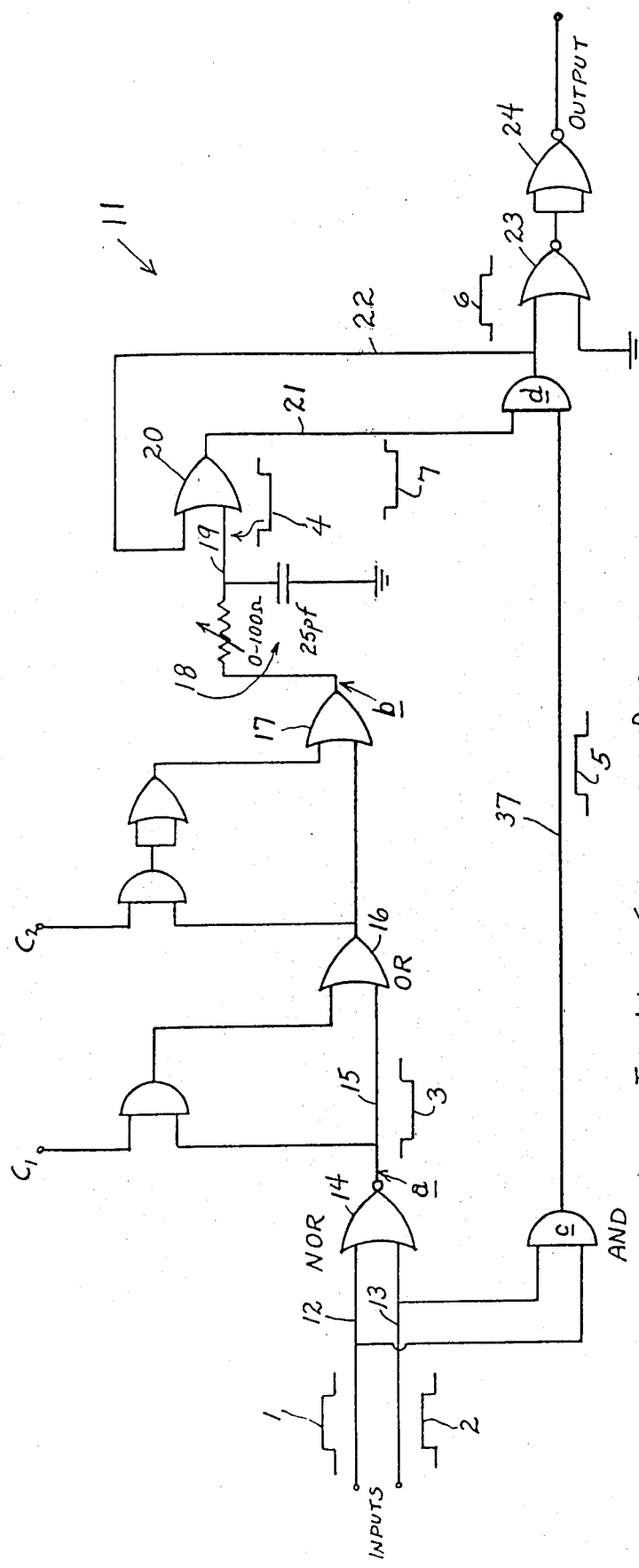
FIG. 1 is a schematic wiring diagram of a two-input coincidence detector adapted to be employed with scintillation detectors in a positron imaging system.

Referring to the drawings, and more particularly to FIGS. 1 and 2, showing a two-input coincidence detector, designated at 11 in FIG. 1, and the associated timing diagrams, shown in FIG. 2, the input wires 12 and 13 are connected to the inputs of a NOR gate 14. As soon as either input wire 12 or 13 goes high, the signal in the output wire 15 will go low (after a small propagation delay). This signal, shown at 3, is further delayed by several gates, such as gates 16, 17, and an R-C time constant circuit 18, to produce a signal 4 in input wire 19 of an OR gate 20. The coincidence resolving time is essentially equal to this delay, and can be programmed by control lines $C_1$ and $C_2$, and associated circuitry, which allow the number of gate propagation delays between points a and b to be set at 2, 3, 4 or 5 propagation delays.

When the second detected pulse arrives at its input wire 12 or 13, the output of AND gate c goes high. This will result in an output from AND gate d, unless pulse 5 arrives after signal 4, and consequently signal 7 (in the output line 21 of gate 20), has gone low. Thus, the maximum separation between the two input pulses for detection as a coincidence is set by the delay from the time of the first pulse until signal 7 goes low.

If signal 5 arrives in time, signal 6 (in feedback line 22 from the output line of AND gate d to an input of OR gate 20) will go high and hold signal 7 high despite the subsequent going low of signal 4. Therefore, the output 6 will persist until either of the inputs 1 or 2 goes low, causing signals 5 and 6 to go low. The last two gates 23, 24 following the output of gate d play no part in the operation of the coincidence detector, but simply buffer said output from subsequent loading so that the loading cannot affect the coincidence resolving time.

It is apparent from the above description that it is completely immaterial as to whether the first input pulse is on either input wire 12 or input wire 13.

As above mentioned, the functional requirements of a system with four groups of detectors could be met by using six 2-input detectors, but only at a considerably greater cost than when using a single 4-input detector, such as will now be described. FIG. 3 shows the general scheme of the device. The four inputs from the four groups of detectors are shown at A, B, C and D, and are digital logic signals which are normally low, but which go high when a gamma ray is detected by one detector in a group. It will be assumed that the detection of more than two gamma rays during the time that this device takes to operate is such a rare occurrence that it can be ignored. It is further assumed that all elements, except the delay element, shown at 25, operate infinitely fast. The finite operating speed of actual elements simply modifies the effective delay.

The system of FIG. 3 comprises gate circuitry 28 which will provide an output at a line 33 when any input A, B, C or D is present, and also has gate circuitry 31 which will provide an output at a line 32 when any two of the inputs A, B, C or D are present.

When any input A, B, C or D goes high, the AND gate, shown at 26, is disabled after a delay T, preventing an output as the result of a second input A, B, C or D going high at any subsequent time. However, if a second input A, B, C or D goes high prior to the expiration of delay T, than the signal in the lower path 32 can pass through the AND gate 26 and set the latch, shown at 27, signifying that a coincidence has occurred. Suitable means, not shown, may be provided for resetting the latch 27.

Figure 4:
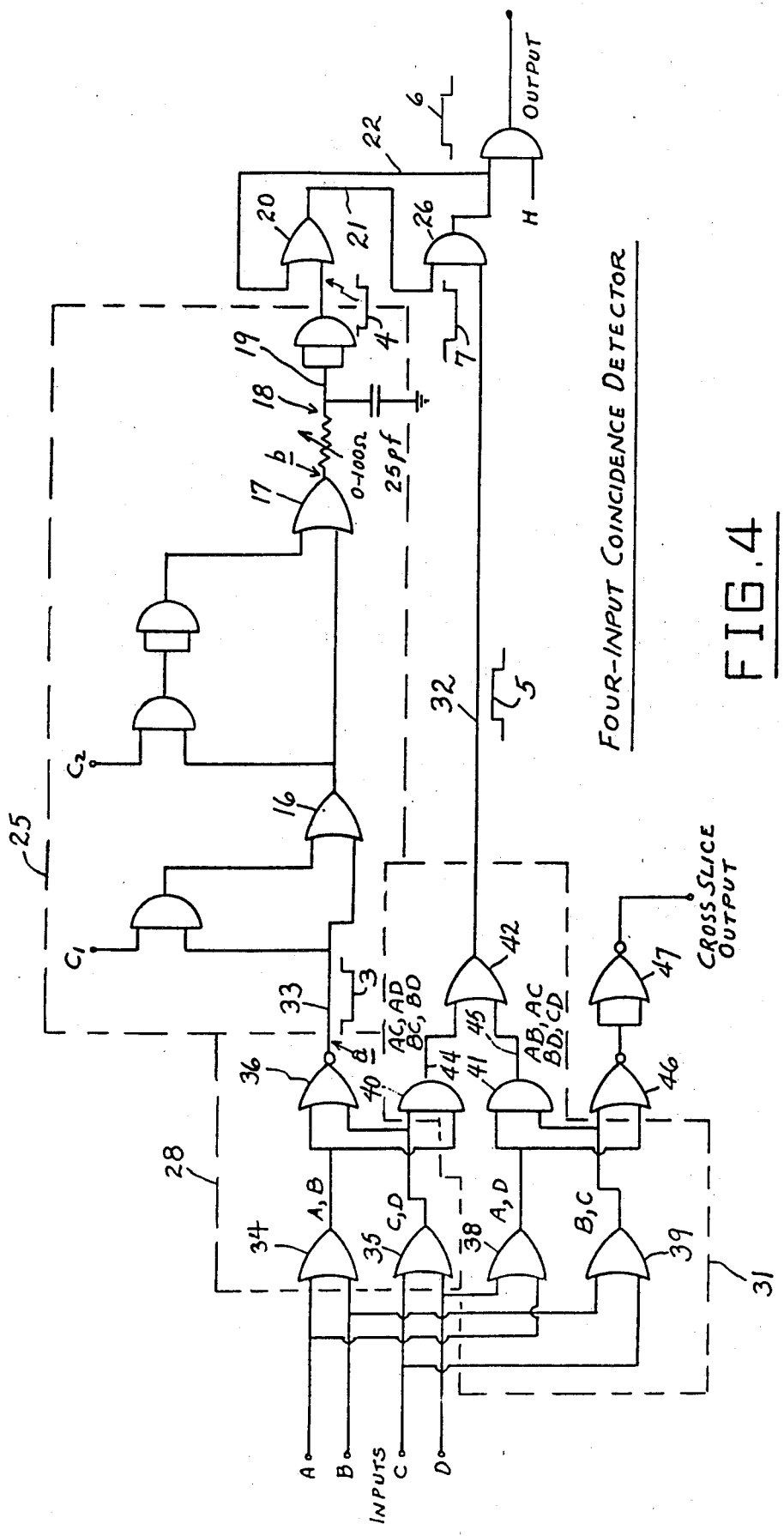
FIG. 4 is a detailed schematic wiring diagram of gates interconnected to provide the functions shown in the block diagram of FIG. 3.

FIG. 4 is a complete schematic diagram of gates interconnected to provide the functions shown in the block diagram of FIG. 3. The "cross slice output" is the same logic signal as the "any one input present" output signal of FIG. 3. However, it is obtained separately, as shown, in order that the most symmetrical possible gate configuration can be provided for each input, as well as causing minimal loading on each gate. These features contribute to optimal timing accuracy.

In the four-input circuit of FIG. 4, operation is identical to the two-input circuit of FIG. 1 past the point a at which the signal 3, which goes low when a pulse arrives on any inputs A, B, C, or D, is developed (wire 15 in FIG. 1), and the point at which signal 5, which goes high as soon as a second pulse has arrived, is developed. Signal 3 is developed in wire 33 by gates 34, 35 and 36, functioning as a four-input NOR gate.

In the two-input circuit of FIG. 1, the signal 5 is developed in the output wire 37 of AND gate c. In the four-input circuit of FIG. 4, the signal 5 is developed by gates 34, 35, 38, 39, 40, 41 and 42, and appears in the output wire 32 of gate 42.

The signal 5 could be developed alternatively with 6 two-input AND gates all feeding into a 6-input OR gate, each AND gate being connected to one of the 6 possible pairs of inputs. However, actual implementation with high speed logic would be awkward and would degrade timing accuracy. In contrast, the configuration shown in FIG. 4 uses only readily-available 2-input gates, with low and symmetrical loading on all input and internal lines.

The operation is as follows: Gates 34, 35 and 40 generate a pulse at output line 44 whenever signals A and C, A and D, B and C, or B and D are high. Similarly, gates 38, 39 and 41 generate a pulse at output line 45 whenever signals A and B, A and D, B and C, or B and D are high. Thus, the output of OR gate 42 will be high whenever any pair of inputs is high. Two of the 6 possible pairs (A and C, and B and D) result in both inputs to OR gate 42 being high, but this is of no consequence, as the propagation delay is essentially identical if one or both inputs are high.

Gates 46 and 47 provide an output whenever any input is high. This feature is not employed in the four-input coincidence detector, but is useful for another system function (for obtaining cross slice output). In addition to this function, gate 46 also maintains complete loading symmetry for gates 34, 35, 38 and 39.

Two programmable delays, controlled by digital signals $C_1$ and $C_2$, provide for the selection of four different coincidence intervals.

It will thus be seen that the specific interconnection of the gates 34, 35, 38, 39, 36, 40, 41 and 42 enables the "any two inputs present" signal (in the line 32 of FIG. 3) to be derived in a very simple, fast, and precise fashion.

As shown in FIG. 4, the "any one input present" section 28 of FIG. 3 comprises the circuitry including the OR gates 34, 35 and the NOR gate 36, with the inputs A and B connected to the input terminals of OR gate 34 and the inputs C and D connected to the input terminals of OR gate 35. The outputs of gates 34 and 35 are respectively connected to the input terminals of NOR gate 36, and the output wire 33 of gate 36 carries the signal 3 to the delay circuit 25.

The "any two inputs present" section 31 comprises the circuitry including the OR gates 34, 35, 38, 39, the AND gates 40, 41, and the OR gate 42. The inputs A and D are connected to the input terminals of OR gate 38 and the inputs B and C are connected to the input terminals of OR gate 39. The outputs of gates 38, 39 are connected to the input terminals of AND gate 41. The output of AND gate 41 is connected to one terminal of OR gate 42.

The outputs of OR gate 34 and OR gate 35 are connected to the input terminals of AND gate 40. The output of AND gate 40 is connected to the remaining input terminal of OR gate 42. The output wire 32 of OR gate 42 carries the signal 5 to one input terminal of AND gate 26.

The output signal from section 28 is delayed in delay section 25 and inverted, being furnished as in FIG. 1 to the remaining input terminal of AND gate 26 (corresponding to AND gate d in FIG. 1).

It will be seen that since the A,B output of OR gate 34 and the C,D output of OR gate 35 are connected to the respective inputs of NOR gate 36, a disabling signal 3 will be developed in line 33 responsive to the presence of any one of the A, B, C or D input signals. Also, since the A,B output of OR gate 34 and the C,D output of OR gate 35 are respectively connected to the input terminals of AND gate 40, and the A,D output of OR gate 38 and the B,C output of OR gate 39 are respectively connected to the input terminals of AND gate 41, one or the other of the AND gates 40 or 41 will conduct when there is common presence of any pair of input signals A, B, C or D. This will provide an input to one or the other of the input terminals of OR gate 42 and will develop the high signal 5 in the output line 32 of OR gate 42. Therefore, the presence of any two inputs will supply a high signal 5 to the AND gate 26.

Thus in FIG. 4, the first scintillation signal causes NOR gate 36 to form a signal 3, which, after the selected delay period T, forms a disabling signal 7 for the AND gate 26. Where "coincidence" is present, high signal 5, formed by the second scintillation signal, arrives at AND gate 26 before the disabling signal 7. The feedback line 22 causes signal 6 to be held high even after the disabling signal 4 arrives at OR gate 20.

If disabling signal 7 arrives at AND gate 26 before signal 5, namely, where the selected delay period T is exceeded, there is no coincidence, and there is no high output signal 6 from AND gate 26, as shown in the leftward portion of FIG. 2.

While a specific embodiment of an improved four-input scintillation coincidence detection device has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A four-input scintillation coincidence detection device comprising four respective input terminals, single-input detection means for detecting the presence of a signal at any one of said four input terminals and for providing a first output signal, an AND gate, a delay circuit, circuit means connecting said first output signal to one input terminal of said AND gate via said delay circuit, whereby to provide a predetermined time delay of said first output signal, multiple-input detection means for detecting the presence of two respective signals at any two of said four input terminals and for providing a second output signal responsive to such last-named two-signal presence, circuit means connecting said second output signal to the remaining input terminal of said AND gate, and means to enable the AND gate to generate a coincidence output signal when said two respective signals are developed within a period shorter in length than said predetermined time delay.

2. The coincidence detection device of claim 1, and latch means connected to the output of said AND gate.

3. The coincidence detection device of claim 1, and wherein said delay circuit includes gate means and means to set the delay circuit to provide a delay in accordance with a selected number of gate propagation delays.

4. The coincidence detection device of claim 1, and wherein said single-input detection means comprises first and second OR gates, circuit means connecting the four input terminals to the respective inputs of said first and second OR gates, first output gate means arranged to generate said first output signal in response to an input signal, and circuit means connecting the outputs of said first and second OR gates as inputs to said first output gate means.

5. The coincidence detection device of claim 4, and wherein said first output gate means comprises a NOR gate.

6. The coincidence detection device of claim 4, and wherein said multiple-input detection means comprises third and fourth OR gates, circuit means connecting the four input terminals respectively to the inputs of said third and fourth OR gates, AND gate means for generating said second output signal, and circuit means connecting the outputs of said third and fourth OR gates as inputs to said AND gate means.

7. The coincidence detection device of claim 6, and wherein said last-named AND gate means comprises an AND gate, the outputs of said third and fourth OR gates being connected respectively to the inputs of said last-named AND gate, a fifth OR gate for generating said second output signal, and circuit means connecting the output of said last-named AND gate to one of the input terminals of said fifth OR gate.

8. The coincidence detection device of claim 7, and means to apply a signal to the other input terminal of said fifth OR gate responsive to output signals from both the first and second OR gates.

9. The coincidence detection device of claim 8, and wherein said means to apply a signal to said other input terminal comprises an AND gate, circuit means connecting the outputs of said first and second OR gates to the respective inputs of said last-named AND gate, and circuit means connecting the output of said last-named AND gate to said other input terminal of the fifth OR gate.

10. The coincidence detection device of claim 1, and wherein said delay circuit includes a plurality of programming gate circuit means, means to set said programming circuit means to provide a delay in accordance with a selected number of gate propagation delays, and an adjustable R-C time constant output circuit connected to the output of said plurality of programming gate circuit means.

11. The coincidence detection device of claim 1, and wherein said first time delayed output signal attains the necessary characteristics for preventing the generation of the coincidence output signal if said first output signal reaches the AND gate before said second output signal.

12. The coincidence detection device of claim 1, and wherein said first output signal is in a form to disable said AND gate.

13. The coincidence detection device of claim 12, and means to maintain said coincidence output signal even if said first output signal reaches the AND gate later than said second output signal.

14. The coincidence detection device of claim 13, and wherein said coincidence output signal-maintaining means comprises feedback circuits means from the output of the AND gate to the input of the AND gate to nullify the disabling signal.

* * * * *